United States Patent
Andersen et al.

(10) Patent No.: US 11,480,151 B2
(45) Date of Patent: Oct. 25, 2022

(54) WIND TURBINE WITH A BLADE CARRYING STRUCTURE HAVING AERODYNAMIC PROPERTIES

(71) Applicant: Vestas Wind Systems A/S, Aarhus N. (DK)

(72) Inventors: Peter Bjørn Andersen, Skanderborg (DK); Thomas S. Bjertrup Nielsen, Randers Sv (DK); Mikkel Kiilerich Østerlund, Aarhus C (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/271,357

(22) PCT Filed: Sep. 13, 2019

(86) PCT No.: PCT/DK2019/050271
§ 371 (c)(1),
(2) Date: Feb. 25, 2021

(87) PCT Pub. No.: WO2020/052727
PCT Pub. Date: Mar. 19, 2020

(65) Prior Publication Data
US 2021/0310463 A1    Oct. 7, 2021

(30) Foreign Application Priority Data
Sep. 13, 2018 (DK) .............. PA 2018 70591

(51) Int. Cl.
*F03D 7/02* (2006.01)
*F03D 1/06* (2006.01)

(52) U.S. Cl.
CPC ......... *F03D 7/0236* (2013.01); *F03D 1/0633* (2013.01); *F03D 1/0675* (2013.01)

(58) Field of Classification Search
CPC .... F03D 7/0236; F03D 1/0633; F03D 1/0675; F03D 7/0252; Y02E 10/72
See application file for complete search history.

(56) References Cited

U.S. PATENT DOCUMENTS 4,533,297 A * 8/1985 Bassett ................. F03D 1/0658
416/132 B
4,632,637 A * 12/1986 Traudt ................. F03D 1/0608
416/41

(Continued)

FOREIGN PATENT DOCUMENTS

| NL | 1002324 C1 | 8/1997 |
| WO | 2010048959 A2 | 5/2010 |

OTHER PUBLICATIONS

Danish Patent and Trademark Office, Search and Examination Report in PA 2018 70591, dated Mar. 13, 2019.

(Continued)

*Primary Examiner* — Aaron R Eastman
(74) *Attorney, Agent, or Firm* — Wood Herron & Evans LLP

(57) ABSTRACT

A wind turbine (1) comprising a tower (2), a nacelle (3) mounted on the tower (2) via a yaw system, a hub (4) mounted rotatably on the nacelle (3), the hub (4) comprising a blade carrying structure (5), and one or more wind turbine blades (6) connected to the blade carrying structure (5) via a hinge (7) is disclosed. Each wind turbine blade (6) is thereby arranged to perform pivot movements relative to the blade carrying structure (5) between a minimum pivot angle and a maximum pivot angle. The blade carrying structure (5) is provided with one or more elements (8) configured to improve aerodynamic properties of a surface of the blade carrying structure (5) by increasing a lift and/or decreasing a drag of the blade carrying structure. The increase in lift (Continued)

and/or decrease in drag varies as a function of angle of attack (AOA) between the blade carrying structure (5) and the incoming wind.

13 Claims, 12 Drawing Sheets

(56) References Cited

U.S. PATENT DOCUMENTS

| | | | | |
|---|---|---|---|---|
| 2009/0208337 A1* | 8/2009 | Chambers | ............... | F03D 3/062 416/210 R |
| 2010/0133848 A1* | 6/2010 | Piasecki | ................ | F03D 1/0658 290/55 |
| 2013/0259689 A1* | 10/2013 | Eisenberg | ............. | F03D 1/0675 416/23 |
| 2015/0010403 A1 | 1/2015 | Wilson et al. | | |
| 2015/0211487 A1* | 7/2015 | Dixon | .................... | F03D 7/022 416/23 |
| 2016/0047357 A1* | 2/2016 | Erbsloh | ................ | F03D 1/0675 416/244 R |
| 2021/0207582 A1* | 7/2021 | Nielsen | ................ | F03D 7/0244 |
| 2021/0310463 A1* | 10/2021 | Andersen | ............. | F03D 7/0236 |

OTHER PUBLICATIONS

European Patent Office, International Search Report and Written Opinion in PCT Application No. PCT/DK2019/050271, dated Dec. 12, 2019.

\* cited by examiner

WIND TURBINE WITH A BLADE CARRYING STRUCTURE HAVING AERODYNAMIC PROPERTIES

FIELD OF THE INVENTION

The present invention relates to a wind turbine with one or more blades connected pivotally to a blade carrying structure. The wind turbine of the present invention improves the utilisation of a swept area of the rotor.

BACKGROUND OF THE INVENTION

Wind turbines are typically provided with wind turbine blades normally designed to be in one piece extending radially from a rotor of the wind turbine and which are designed to have an airfoil type shape. This shape provides optimized lift and drag forces acting on the blades which then lead to an optimized utilization of wind resources. Furthermore, these wind turbine blades may be pitch controlled, i.e., the angle of attack of the wind turbine blade relative to the incoming wind is adjusted by rotating the wind turbine blade about a longitudinal axis.

Alternatively, wind turbines may be provided with wind turbine blades which are connected to a blade carrying structure via hinges, thereby allowing a pivot angle defined between the wind turbine blades and the blade carrying structure to be varied. In such wind turbines the diameter of the rotor of the wind turbine, and thereby the area swept by the rotor, is varied when the pivot angle is varied. The blade carrying structure of this wind turbine type typically does not have favourable aerodynamic properties, and therefore it does not contribute to the energy conversion of the wind turbine. However, it occupies part of the swept area of the rotor, and therefore the area occupied by the blade carrying structure may be regarded as an inactive part of the swept area.

U.S. Pat. No. 4,632,637 discloses a high speed, downwind horizontal axis wind turbine having three circumferentially spaced lightweight blades having inner support arms radially outwardly disposed blade segments which are pivotally connected to the support arms, so as to fold straight downwind under high wind conditions or high rotating speeds.

DESCRIPTION OF THE INVENTION

It is an object of embodiments of the invention to provide a wind turbine with hinged blades having an increased aerodynamic performance, in particular at low wind speeds, compared to prior art wind turbines with hinged blades.

It is a further object of embodiment of the invention to provide a wind turbine with an increased effective swept area, in particular at low wind speeds, compared to prior art wind turbines with hinged blades.

The invention provides a wind turbine comprising a tower, a nacelle mounted on the tower via a yaw system, a hub mounted rotatably on the nacelle, the hub comprising a blade carrying structure, and one or more wind turbine blades connected to the blade carrying structure via a hinge, each wind turbine blade thereby being arranged to perform pivot movements relative to the blade carrying structure between a minimum pivot angle and a maximum pivot angle,
wherein the blade carrying structure is provided with one or more elements configured to improve aerodynamic properties of a surface of the blade carrying structure by increasing a lift and/or decreasing a drag of the blade carrying structure, and
wherein the increase in lift and/or decrease in drag varies as a function of angle of attack (AOA) between the blade carrying structure and the incoming wind.

Thus, the invention provides a wind turbine comprising one or more wind turbine blades connected to a blade carrying structure. The wind turbine may comprise only one nacelle, in which case the wind turbine is of a single rotor type. In this case the nacelle will typically be mounted on top of the tower. Alternatively, the wind turbine may comprise two or more nacelles, in which case the wind turbine is of a multirotor type. In this case at least some of the nacelles may be mounted directly on the tower and/or at least some of the nacelles may be mounted on the tower via load carrying structures, e.g. comprising arms extending in a direction away from the centre axis of the tower. Each nacelle may be mounted on the tower via a separate yaw system, or two or more nacelles may be mounted on the tower via a common yaw system, in which case these nacelles are yawed together relative to the tower.

In any event, since the nacelle(s) is/are mounted on the tower via a yaw system, they can rotate about a substantially vertical rotational axis, relative to the tower, in order to direct one or more rotors of the wind turbine into the incoming wind. The yaw system may be an active yaw system in which the nacelle is rotated actively by means of a yaw drive mechanism, e.g. on the basis of measurements of the wind direction. As an alternative, the yaw system may be a passive yaw system in which the nacelle automatically rotates according to the wind direction without the use of a yaw drive mechanism.

The nacelle may be a traditional nacelle having an outer wall enclosing an interior of the nacelle, the nacelle housing various components of the wind turbine, such as generator, drive train, etc. As an alternative, the nacelle may simply be a structure which is capable of performing yawing movements relative to the tower. In this case some or all of the components described above may be arranged outside the nacelle, e.g. in an interior part of the tower.

A hub is mounted rotatably on the nacelle. The hub comprises a blade carrying structure having one or more wind turbine blades connected thereto. Accordingly, the wind turbine blades rotate along with the hub and the blade carrying structure relative to the nacelle.

The wind turbine is preferably a horizontal axis wind turbine.

Each of the wind turbine blades is connected to the blade carrying structure via a hinge. Thereby each wind turbine blade is arranged to perform pivot movements relative to the blade carrying structure, via the hinge. A pivot angle is thereby defined between each wind turbine blade and the blade carrying structure, depending on the position of the hinge and thereby of the wind turbine blade relative to the blade carrying structure. Accordingly, the pivot angle defines the direction along which a given wind turbine blade extends relative the blade carrying structure, and thereby relative to the hub. This, in turn, determines a diameter of the rotor, and thereby the ability of the wind turbine to extract energy from the wind.

The hinge may be or comprise a bearing, e.g. in the form of a journal bearing, a roller bearing, or any other suitable kind of bearing.

The pivot angle can vary between a minimum pivot angle, defining a maximum rotor diameter, and a maximum pivot angle, defining a minimum rotor diameter.

According to the invention, the blade carrying structure is provided with one or more elements configured to improve aerodynamic properties of a surface of the blade carrying structure by increasing a lift and/or decreasing a drag of the blade carrying structure.

The blade carrying structure occupies part of the swept area of the rotor which may be utilized if its aerodynamic properties can be improved. The elements may have different form and may be positioned at various places on the blade carrying structure as it will be described below. The form and position of the elements results in lowering drag forces and/or increasing lift forces imposed on the blade carrying structure, especially at low wind speeds. By lowering the drag forces and/or increasing the lift forces of the blade carrying structure, the blade carrying structure with the elements thereon contribute to the energy conversion of the wind turbine. Thereby the part of the swept area, which is occupied by the blade carrying structure, is also utilized for energy production, i.e. it is 'activated', and thereby the total swept area is utilized to a greater extent.

The increase in lift and/or decrease in drag varies as a function of angle of attack (AOA) between the blade carrying structure and the incoming wind.

Thus, the elements configured to increase the lift and/or decrease the drag of the blade carrying structure are arranged and designed in such a way that their function change as the angle of attack changes. The local angle of attack in a cross section of the blade carrying structure is defined as the angle between a chord defined by a relevant section of the blade carrying structure, e.g. a section of an arm, and the relative wind speed, where the relative wind speed is the resultant vector of the local incoming wind speed vector and the local rotational speed vector of the structure.

In the case that the relevant section of the blade carrying structure has a cross-section in the form of a circle or an ellipse, i.e. not an airfoil, the chord may be defined as the line across the circle or ellipse that is parallel to the rotational plane of the blade carrying structure part. Thereby, the angle of attack changes as the rotational speed of the wind turbine changes. The elements may be positioned in such a manner that they increase lift at some angles of attack while at some other angles of attack they do not influence lift. Similarly, the elements may be positioned in such a manner that they decrease drag at some angles of attack while at some other angles of attack they do not influence drag.

The elements may be designed in such a way that they increase the lift coefficient of the blade carrying structure at low rotational speeds, i.e., at angles of attack which occur at low wind speeds, and especially during start-up of the wind turbine, but do not increase the lift coefficient, or only increases the lift coefficient to a lesser extent, at angles of attack at higher wind speeds, when the increase is not needed. This could, e.g., be achieved by appropriate distribution of elements along a radial direction and/or along a circumference of blade carrying structure. Specific designs of the elements which fulfil these conditions will be described in more details below, with reference to the accompanying drawings.

Similarly, the elements may be designed in such a way that they decrease the drag coefficient of the blade carrying structure at high angles of attack, i.e. at a combination of low rotational speeds and high wind speeds, e.g. occurring at idling and/or parked conditions, but do not decrease the drag coefficient, or only decreases the drag coefficient to a lesser extent, at angles of attack at lower wind speeds. This could also be achieved by appropriately distributing the elements, similarly to the situation described above.

The elements may also be designed in such a way that the highest lift and the lowest drag is obtained in the same range of angles of attack.

Examples of lift increasing elements include, but are not limited to, gurney flaps, vortex generators, and stall taps. As another example, an airfoil, e.g. in the form of a leading edge portion and a trailing edge portion, could be mounted on the blade carrying structure in order to increase the lift of the blade carrying structure. As another example, the blade carrying structure could be provided with one or more holes or passages allowing airflow out of or into the blade carrying structure in order to change the boundary layer of the blade carrying structure, thereby increasing the lift of the blade carrying structure. One more example of lift generating elements may be formed by two bended profiles positioned against each other forming a shell-like structure. This element is hereinafter referred to as 'sea shell'. Yet another example of lift generating elements may be in the form of an undulating surface pattern mimicking whale-like curves. This type of elements is hereinafter referred to as 'whale curves'.

Examples of drag decreasing elements include, but are not limited to, airfoils, airflow out of/into holes, or similar. As another example, elements which mimic a skin of sharks, which is created by nature for reducing drag in water flow, resulting in the efficient movement of sharks through the water may also be used. This type of elements is hereinafter referred to as 'shark skin'. Yet another example of a drag reducing element is a dented surface, similar to the surface of a golf ball. Such a surface trips the boundary layer, providing a smaller and more steady wake, thereby reducing the drag. All these elements may work together with lift generating elements drastically improving aerodynamic properties of the blade carrying structure.

Thus, the elements are positioned on the blade carrying structure in such a manner that, at any given angle of attack, an appropriate increase in lift and/or decrease in drag is obtained. Thereby the previously 'inactive' part of the rotor area is 'activated' in a manner which is appropriate under the given angle of attack, and thereby under the given wind conditions. Thereby the ability of the wind turbine to extract energy from the wind is improved, but only to the extent which is necessary or appropriate, given the prevailing wind conditions.

Thus, the increase in lift may vary as a function of angle of attack in such a manner that the lift decreases as the angle of attack increases. The angle of attack is expected to be smallest at low wind speeds and largest at high wind speeds. Therefore, according to this embodiment, the increase in lift is smaller at large angles of attack, and thereby high wind speeds, than the increase in lift at small angles of attack, and thereby low wind speeds. Accordingly, at low wind speeds, where it is desirable to extract as much energy from the wind as possible, the elements provide a large increase in lift, thereby significantly improving the aerodynamic properties of the blade carrying structure. However, at larger angles of attack, and thereby higher wind speeds, where it is not as relevant to improve the extraction of energy from the wind, the increase in lift is reduced, thereby reducing the contribution to the energy production originating from the part of the rotor area which is swept by the blade carrying structure.

Alternatively or additionally, the decrease in drag may vary as a function of angle of attack in such a manner that the drag decreases as the angle of attack increases. According to this embodiment, the decrease in drag is larger at large angles of attack, and thereby high wind speeds, than the decrease in drag at small angles of attack, and thereby low wind speeds. As a result, the drag of the blade carrying structure may be larger at low wind speeds than at high wind speeds. Thereby, at extremely high wind speeds, such as storm and/or parked or idling conditions, where the angle of attack is very large, the drag of the blade carrying structure is low, thereby ensuring that the wind turbine is protected to the greatest possible extent against the strong wind.

The blade carrying structure may comprise one or more arms, each wind turbine blade being mounted on one of the arms, and one or more of the elements may be arranged on the arms. The arms may extend in a radial direction of the wind turbine. Furthermore, the wind turbine blades may be mounted on the arms such that the blades are acting as an extension of the arms, when the blades are arranged in a position defining minimum pivot angle, i.e., the blade and the arm may extend along substantially parallel directions. The arms may be cylindrical or conical cylindrical providing required support to the wind turbine blades. Each arm may have the elements arranged thereon in such a manner that the resulting arms have improved aerodynamic properties compared to the "bare" arms without any element.

One or more of the elements may be distributed on the arms along a radial direction of the arms and/or along a circumference of the arms. Both the elements placed in radial direction and around the circumference of the arm can be positioned so that they increase the swept area utilized for energy production. The elements placed along the circumference of the arms improve lift and/or lower drag forces imposed on the arms, thereby improving the aerodynamic properties of the arms when desired. Namely, the elements can be selected and carefully positioned around the circumference of the arms and/or along the length of the arms in such a manner that at some positions they experience the wind in one way while at other positions they experience the wind in another way. Thereby the aerodynamic properties of the arms of the blade carrying structure can be designed in such a manner that at some angles of attack, which are usually occurring at low wind speeds, the aerodynamic properties are changed significantly, while at other angles of attack, which are usually occurring at high wind speeds, the change in aerodynamic properties is insignificant, as described above. The specific distribution of the elements on the arms may depend on their size and structure. Details about distribution of various types of elements will be disclosed below when describing each of the elements in particular.

Alternatively or additionally, one or more of the elements could be arranged on any other part of the blade carrying structure, including a part of the hinge, a part connecting the blade carrying structure to the hub and the hub itself.

Each of the wind turbine blades may define an aerodynamic profile between an inner tip and an outer tip, and the hinge may be arranged on the wind turbine blade at a distance from the inner tip and at a distance from the outer tip. The aerodynamic profile may be an airfoil. In the present context the term "inner tip" should be interpreted to mean an extremity of the wind turbine blade arranged closest to a hub of the wind turbine. Similarly, in the present context the term "outer tip" should be interpreted to mean another extremity of the wind turbine blade arranged furthest away from the hub. The hinge may be arranged at a non-zero distance from the inner tip and at a non-zero distance from the outer tip. Thereby the wind turbine blade may be hinged to the blade carrying structure at a position which is not at an end of the wind turbine blade. Such an arrangement may result in an aerodynamic interaction between the wind turbine blade and the blade carrying structure, thereby improving aerodynamic properties of the blade carrying structure.

In one embodiment of the invention, a part of the wind turbine blade may be arranged adjacent to a part of the blade carrying structure when the wind turbine blade is in a position defining minimum pivot angle, thereby forming an overlapping region between the wind turbine blade and the blade carrying structure, and the elements may be arranged on the blade carrying structure outside of the overlapping region.

When the wind turbine blades form the minimum pivot angle with the blade carrying structure they are positioned at the minimum distance to the blade carrying structure, and the overlapping region may be formed there between. A part of the blade carrying structure may, in combination with an inner part of the blade which defines the overlapping region, contribute to the conversion efficiency of the wind turbine as the portions of the blade carrying structure and the adjacent part of the wind turbine blade can work together improving the lift forces as the flow is guided by the inner part of the blade and the blade carrying structure adjacent to the inner part of the blade. The size of the overlapping region depends on the size of the inner part of the blade which overlaps with the blade carrying structure. In order to maximize the size of this overlapping region, the inner part of the blade may be made larger. However, this may not be an option as a large inner part may collide with a hub and/or nacelle of the wind turbine as the blades pivot. Thereby, there will always be a region of the blade carrying structure which is not used for power production. According to the invention, this region can be redesigned by arranging the elements thereon and thereby improving aerodynamic properties of the blade carrying structure portion with the elements. This is in particular important during start-up of the wind turbine as it will allow the wind turbine to accelerate more quickly and start power production immediately upon start-up.

On the other hand, when the wind turbine blades are arranged at a position defining a larger pivot angle, which may be the case at higher wind speeds, the wind turbine blades are positioned at a larger distance from the blade carrying structure. In this scenario, the part of the swept area which corresponds to the overlapping region of the blade carrying structure does not contribute to the lift coefficient, because no elements are arranged in this region, and because the aerodynamic profiles of the wind turbine blades are also not arranged in this area. This is desirable because high lift may, in this case, be undesirable and may have detrimental effects on the wind turbine at high wind speeds as the rotor already rotates with high rotational speeds and further increase is not needed. Accordingly, positioning the elements outside the overlapping region provides a structure in which the aerodynamic properties of the blade carrying structure are improved at low wind speeds, but not at high wind speeds.

As an alternative, elements of one kind may be arranged on the blade carrying structure outside the overlapping region, while elements of another kind may be arranged in the overlapping region. For instance, elements which provide a significant increase in lift at small angles of attack may be provided outside the overlapping region. In the overlapping region, elements may be selected which cooperate with the inner blade part in increasing the lift at small angles of attack. An example of such an element is an aerodynamic profile.

At least one of the elements may be configured to increase a lift of the blade carrying structure. According to this embodiment, the aerodynamic properties of the blade carrying structure are improved in such a manner that the lift acting on the blade carrying structure is increased. This will allow the blade carrying structure to increase the lift of the entire rotor, thereby allowing the combination of the wind turbine blades and the blade carrying structure to extract more energy from the wind.

Some of the lift increasing elements described above, such as gurney flaps, sea shells, vortex generators and stall taps, may also influence drag forces on the blade carrying structure by increasing it. However, the increase in drag is smaller than, and may even be negligible compared to, the increase in lift, and the overall effect of the abovementioned elements thereby creates an increase in lift. Furthermore, gurney flaps, sea shells, vortex generators and stall taps may be optimized in such a manner that they increase the lift coefficient of the blade carrying structure only in specific angle of attack intervals, while outside of these specific intervals the elements would create no or only insignificant lift. Thereby, these elements may not create additional lift at high wind speeds when high lift is undesirable and may have detrimental effects on the wind turbine.

The gurney flaps can be designed and positioned on the blade carrying structure arms in such a manner that they increase air circulation for given angles of attack, thereby generating lift at low wind speeds. The gurney flaps may have different length and may be distributed along and around the arm such that each flap experiences different angles of attack and thereby individually contributes to the lift coefficient. The gurney flaps are typically projecting from the trailing edge or positions near the trailing edge of the blade carrying structure arm. More precisely, the gurney flaps can be projecting from the blade carrying structure arm where the gurney flap is close to a stagnation pressure for high wind speeds. In the case when the arm has a cylindrical cross-section, the trailing edge of the arm is a portion of the arm which does not face the wind.

The vortex generators, as the gurney flaps, may increase wind circulation for given angles of attack, thus generating lift at low wind speeds. In addition, the vortex generators can also be used to lower noise emission from the blade carrying structure as the vortex structured in the boundary layer is broken into smaller vortexes which the air more easily can absorb. Furthermore, this changes the frequency spectrum of the total noise towards having more energy at higher frequencies which dissipate faster over a distance from the wind turbine.

The stall taps, as the gurney flaps, can be arranged on carefully chosen locations along the blade carrying structure arm to modify the aerodynamic characteristics of the arm and increase lift coefficient of the arm. The locations where the stall taps can be arranged are on the side of the arm which experiences positive angles of attack or on a leading edge of the arm, if the arm is in the form of an airfoil. The stall taps initiate flow separation at the chosen locations, especially when the arm enters stall.

The airflow into/out of holes can be generated when air circulate through holes formed in the blade carrying structure. Some holes can be configured to suck air circulating along the blade carrying structure. Alternatively or additionally, the holes may be configured to blow the air which circulates along the arm. In this case the holes may be connected to an operable air source. By use of sucking and/or blowing holes formed in the blade carrying structure, additional lift can be generated acting on the blade carrying structure. Furthermore, the airflow into/out of the holes can reduce noise generated by the blade carrying structure and it may cause reduction of loads created by the blade carrying structure.

As mentioned above, the sea shell may be formed by two bended profiles positioned against each other. The bends may be bonded to each other and also to the blade carrying structure. These two bended profiles may be optimized for increased lift in specific angles of attack intervals as mentioned above. The sea shell may be formed in plastic or another material. Bonding the plastic profiles to the surface of the blade carrying structure makes the sea shells an extremely robust solution which may last for a long period of time.

The whale curves may be added by, e.g., bonding to the blade carrying structure. They have a shape which is similar to one which whales have to help them swim in the water. The whale curves guide flow through a fluid and in the case of wind turbines, around the blade carrying structure thereby generating lift which acts on the portion of the blade carrying structure where the whale curves are arranged.

The blade carrying structure may comprise holes through which air may flow creating airflow out of the holes or airflow into the holes, depending on the position of the holes on the blade carrying structure. When the blade carrying structure rotates, a boundary layer of air is created along its surface developing turbulence. By sucking and/or blowing air through the holes in or away from the surface of the blade carrying structure, the boundary layer of air is continuously removed thereby reducing drag forces acting on the blade carrying structure. In addition, created airflow may reduce noise and loads imposed on the blade carrying structure.

As mentioned above, the shark skin elements mimicking a skin of sharks, are therefore configured to reduce drag coefficient of the blade carrying structure. They comprise tiny scales also known as dermal denticles which are shaped like small riblets and aligned in the direction of wind flow. Mats of shark skin may be attached to the blade carrying structure, thereby reducing drag forces imposed to the blade carrying structure.

Alternatively or additionally, at least one of the elements may be a vortex generating element. For example, at least one of the vortex generating elements arranged on the blade carrying structure may be in the form of a vortex generator, stall tap, gurney flap, 'sea shell', airflow blowing devices, boundary layer suction devices, or similar. The airflow blowing devices and the boundary layer suction devices may be in the form of holes formed at various positions along the blade carrying structure. All the mentioned examples of vortex generating elements may be designed to control turbulent separated flow along the blade carrying structure and especially at low speeds, thereby improving the aerodynamic properties of the blade carrying structure.

At least one of the elements may be configured to guide a flow along the surface of the blade carrying structure. For example, at least one of the elements arranged on the blade carrying structure guiding the flow along it may be in the form of 'whale curves', airflow out of/into holes, boundary layer suction devices, or similar. A manner of how all these elements guide the flow has already been described above, and will therefore not be described in detail here.

At least one of the elements may be a spoiler. In the present context the term 'spoiler' should be interpreted to mean an element which extends from the blade carrying structure along a direction which has a component parallel to the wind flow passing the blade carrying structure, but also a component perpendicular to the wind flow, i.e. the direction is not parallel to the wind flow. A spoiler thereby guides the flow along the blade carrying structure, thereby increasing lift, in particular at small angles of attack. Furthermore, a spoiler may result in low drag at large angles of attack, i.e. where the spoiler is positioned close to the stagnation point, thereby altering the stagnation pressure, resulting in reduced drag.

At least one of the elements may be glued onto the surface of the blade carrying structure. The majority of the aforementioned types of elements, i.e., the gurney flaps, stall taps, vortex generators, whale curves, sea shells, and airfoils, may be glued onto the blade carrying structure. Furthermore, slats or slot for airfoils may be glued onto, e.g., a leading edge of the hub arm, e.g. with a connecting lattice, and/or one or more extending flaps may be glued onto, e.g., a trailing edge of the hub arm. Gluing is a simple way of attaching the elements, especially on already existing wind turbines, i.e., there is no need for manufacturing a new blade carrying structure with the elements attached. Furthermore, the blade carrying structure may be manufactured in a simple manner, without taking the elements improving the aerodynamic properties into account, and these elements can easily be attached afterwards. This simplifies the manufacturing process significantly.

In one embodiment of the invention, at least one element may be an actively controlled device. According to this embodiment, the elements may be activated, thereby improving the aerodynamic properties of the blade carrying structure, whenever this is suitable, but may remain in a deactivated state, thereby not improving the aerodynamic properties of the blade carrying structure, when this is not suitable. Accordingly, it can be actively controlled whether or not the aerodynamic properties of the blade carrying structure should be improved.

The elements such as gurney flaps, vortex generators, stall taps, holes in the blade carrying structure, and similar may be actively controlled by a control unit of the wind turbine. For instance, the holes may be controlled in such a manner that they are opened/closed in response to wind conditions and/or rotational speed of the wind turbine, or a blowing device may be actively switched on or off. The stall taps may be actively drawn out or redrawn inside the blade carrying structure in response to the wind conditions and/or rotational speed of the wind turbine. The gurney flaps and vortex generators may for instance be repositioned or rotated depending on operational conditions of the wind turbine. By actively controlling the elements, requirements on their design can be relaxed as there will only be a need for designing the elements to improve aerodynamic properties of the wind turbine blade carrying structure at low wind speeds.

In yet another embodiment of the invention, at least one element may be a passive device. According to this embodiment, the elements are fixed, i.e. they are not actively changed in response to various conditions as is the case with the actively controlled elements described above. Having passive devices lower requirements for controlling the elements, thereby lowering maintenance demands. Examples of passive devices include, but are not limited to gurney flaps, vortex generators and fixed stall taps.

BRIEF DESCRIPTION OF THE DRAWINGS

The invention will now be described in further detail with reference to the accompanying drawings in which.

DETAILED DESCRIPTION OF THE DRAWINGS

Figure 1:
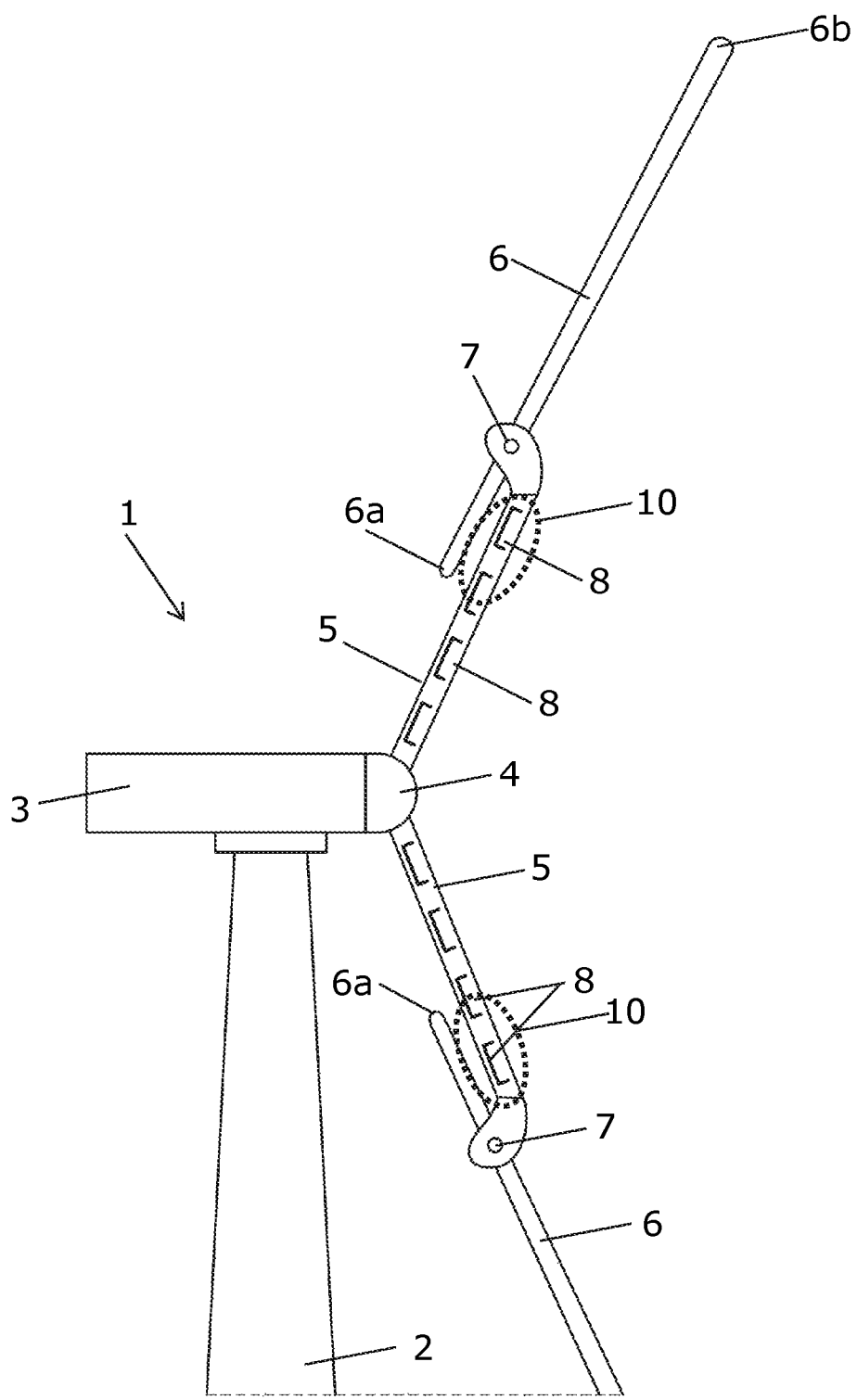
FIG. 1 is a side view of a wind turbine according to an embodiment of the invention.

FIG. 1 is a side view of a wind turbine 1 according to an embodiment of the invention. The wind turbine 1 comprises a tower 2 and a nacelle 3 mounted on the tower 2. A hub 4 is mounted rotatably on the nacelle 3, the hub 4 comprising a blade carrying structure 5. The blade carrying structure 5 comprises three arms (two of which are visible). A wind turbine blade 6 is connected to each of the arms of the blade carrying structure 5 via a hinge 7. Thus, the wind turbine blades 6 rotate along with the hub 4, relative to the nacelle 3, and the wind turbine blades 6 can perform pivoting movements relative to the blade carrying structure 5, via the hinges 7. The wind turbine blades 6 perform pivot movements relative to the blade carrying structure 5 between a minimum pivot angle and a maximum pivot angle. FIG. 1 illustrates the wind turbine blades 6 defining a minimum pivot angle with the blade carrying structure 5, and thereby maximum rotor diameter.

Each of the wind turbine blades 6 defines an aerodynamic profile between an inner tip 6a and an outer tip 6b, and the hinge 7 is arranged on the wind turbine blade 6 at a non-zero distance from the inner tip 6a and at a non-zero distance from the outer tip 6b. Thereby the wind turbine blade 6 is hinged to the blade carrying structure 5 at a position which is not at an end (6a or 6b) of the wind turbine blade 6. When the wind turbine blade 6 forms a minimum pivot angle with the blade carrying structure arm 5, an overlapping region 10 between the wind turbine blade 6 and the blade carrying structure 5 is formed.

The blade carrying structure 5 is provided with elements 8 configured to improve aerodynamic properties of a surface of the blade carrying structure 5. The elements 8 are distributed on the arms 5 along a radial direction of the arms 5 and along the entire length of the arm 5. Additionally, the elements 8 may also be distributed along a circumferential direction of the arm 5.

The blade carrying structure 5 occupies part of the swept area of the rotor which may be utilized if its aerodynamic properties can be improved. Placing the elements 8 at carefully chosen places on the blade carrying structure 5 results in lowering drag forces and/or increasing lift forces imposed on the blade carrying structure 5, especially at low wind speeds. By lowering the drag forces and/or increasing the lift forces of the blade carrying structure 5, the blade carrying structure 5 with the elements 8 thereon contributes to the energy conversion of the wind turbine 1. Thereby the part of the swept area, which is occupied by the blade carrying structure 5, is also utilized for energy production, i.e. it is 'activated', and thereby the total swept area is utilized to a greater extent.

Figure 2:
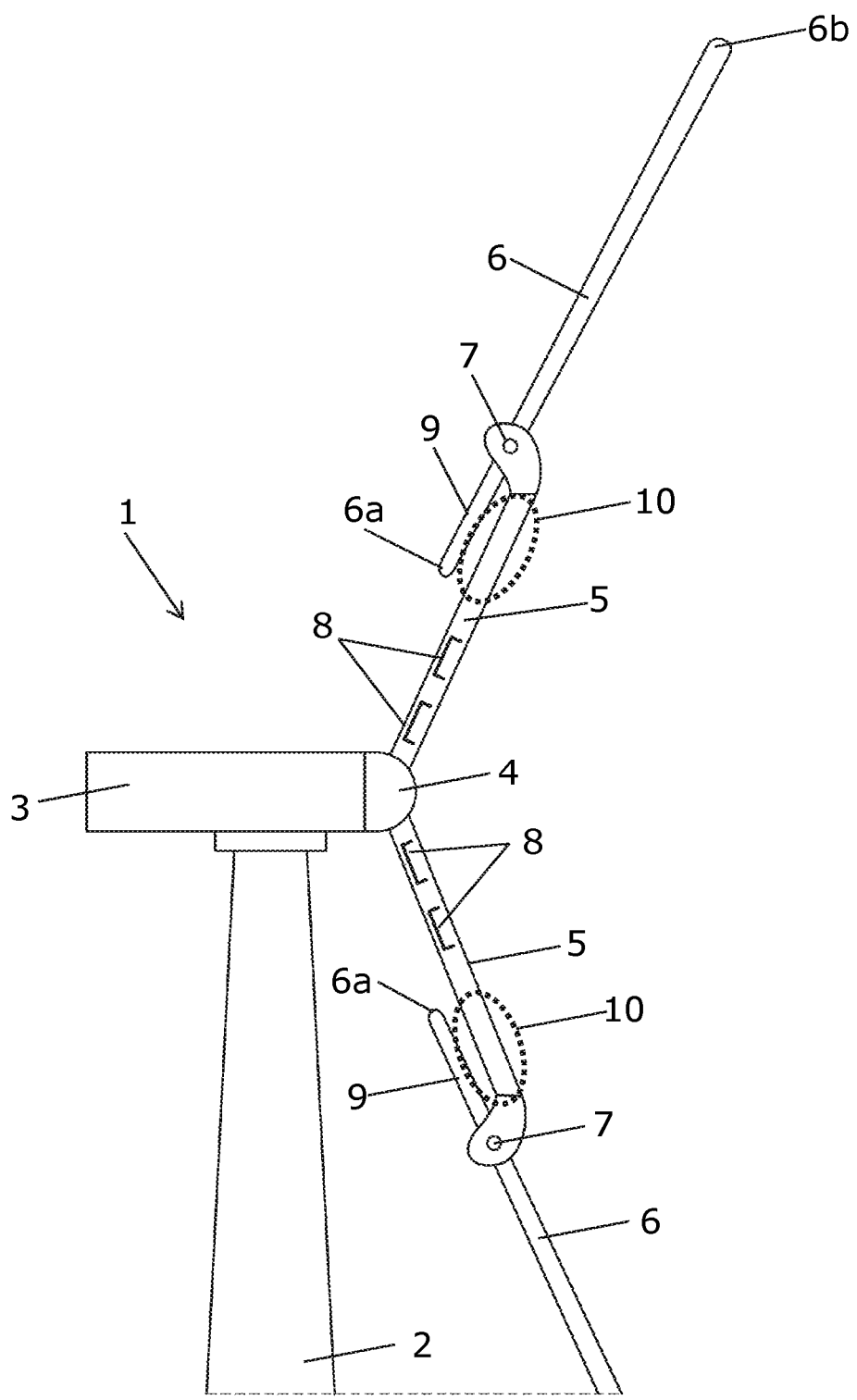
FIG. 2 is a side view of a wind turbine according to another embodiment of the invention.

FIG. 2 is a side view of a wind turbine 1 according to another embodiment of the invention. FIG. 2 is similar to FIG. 1 and it will therefore not be described in details here.

In the embodiment of FIG. 2, the elements 8 are arranged on the blade carrying structure 5 outside of the overlapping region 10. Namely, a part of the blade carrying structure 5 in combination with an inner blade part 9 which defines the overlapping region 10, contribute to the conversion efficiency of the wind turbine 1 as the portions of the blade carrying structure 5 and adjacent part of the wind turbine blade 6 can work together improving the lift forces as the flow is guided by the inner blade part 9 and the blade carrying structure 5 adjacent to the inner blade part 9. Therefore, placing the elements 8 in the overlapping region 10 is unnecessary. The elements 8 arranged on the blade carrying structure 5 outside of the overlapping region 10 are contributing to the aerodynamic properties of the blade carrying structure 5. This is in particular important during start-up of the wind turbine 1 as it will allow the wind turbine 1 to accelerate more quickly and start power production immediately upon start-up.

On the other hand, when the wind turbine blades 6 are arranged at a position defining a larger pivot angle, which may be the case at higher wind speeds, the wind turbine blades 6 are positioned at a larger distance from the blade carrying structure 5. In this scenario, the part of the swept area which corresponds to the overlapping region 10 of the blade carrying structure 5 does not contribute to the lift coefficient, because no elements 8 are arranged in this region 10, and because the aerodynamic profiles of the wind turbine blades 6 are also not arranged in this area 10. This is desirable because high lift may, in this case, be undesirable and may have detrimental effects on the wind turbine at high wind speeds as the rotor already rotates with high rotational speeds and further increase is not needed. Accordingly, positioning the elements 8 outside the overlapping region 10 provides a structure in which the aerodynamic properties of the blade carrying structure 5 are improved at low wind speeds, but not at high wind speeds.

Figure 3:
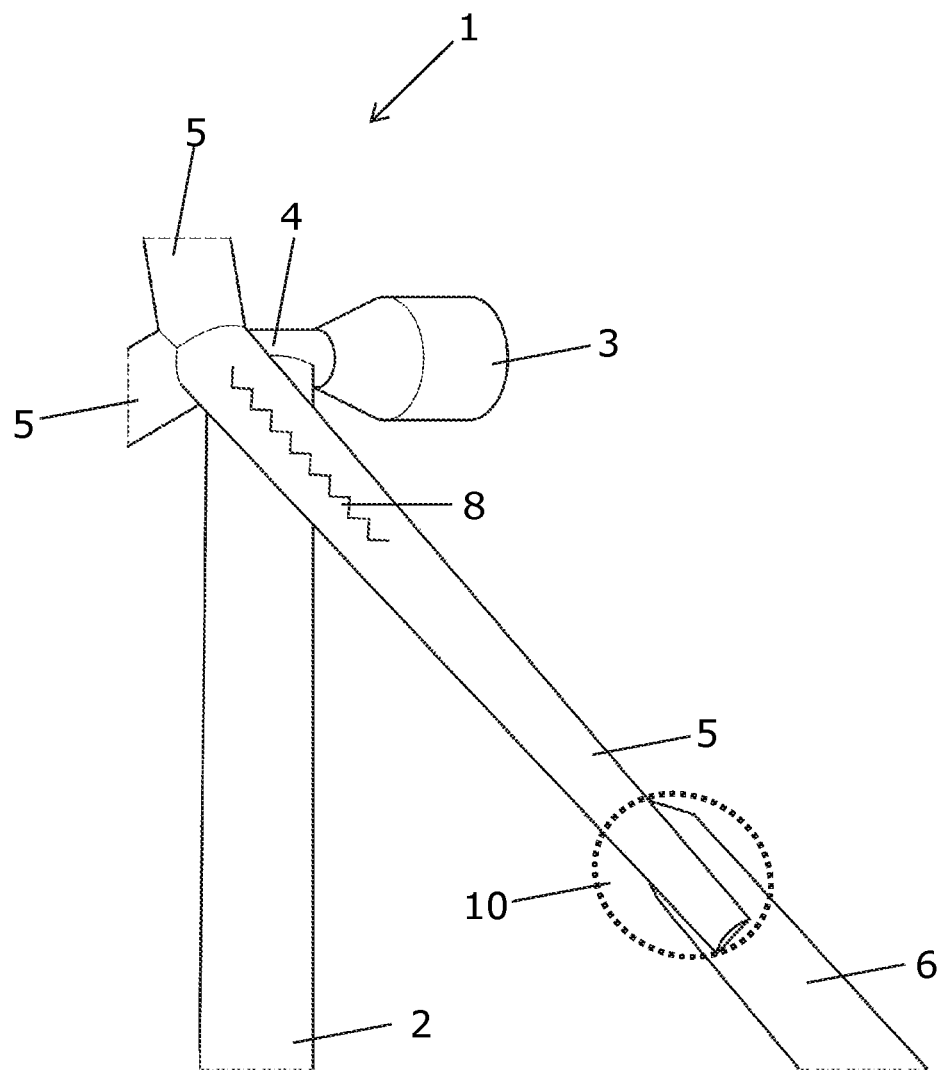
FIG. 3 shows a part of a wind turbine according to a first embodiment of the invention with a blade carrying structure arm provided with elements.

FIG. 3 shows a part of a wind turbine 1 according to a first embodiment of the invention. The wind turbine 1 comprises a blade carrying structure 5 with three conical-cylindrical arms providing required support to the wind turbine blades 6, each arm being provided with elements 8 in the form of vortex generators 8, which increase wind circulation for given angles of attack, thus generating lift at low wind speeds. Only the vortex generators 8 of one of the arms can be seen. The vortex generators 8 are placed at a portion of the blade carrying structure arm 5 closest to the hub 4, and well away from an overlapping region 10, thereby improving aerodynamic properties of the widest part of the arm 5 which is otherwise not utilized as a swept area of the wind turbine 1. The vortex generators 8 may be designed to control turbulent separated flow along the blade carrying structure 5 and especially at low wind speeds, thereby improving the aerodynamic properties of the blade carrying structure 5.

Figure 4:
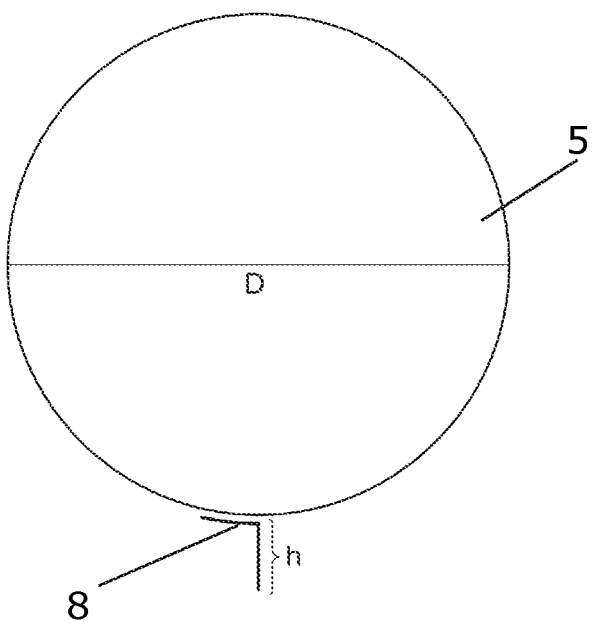
FIG. 4 shows a blade carrying structure arm of a wind turbine according to a second embodiment of the invention.

FIG. 4 shows a blade carrying structure arm 5 of a wind turbine according to a second embodiment of the invention. The blade carrying structure arm 5 is provided with an element 8 in the form of a gurney flap 8. The gurney flap 8 can be designed and positioned on the blade carrying structure arm 5 in such a manner that it increases air circulation for given angles of attack, thereby generating lift at low wind speeds. The gurney flap 8 has a height-diameter ratio defined in percentages (%) as a ratio between a height h of the gurney flap 8 and a diameter D of the arm 5. The height-diameter ratio may range from 1% and up to 15% and it depends on an exact position of the gurney flap along the blade carrying structure 5. The gurney flap 8 can also be designed to act as a vortex generating element.

Figure 5A:
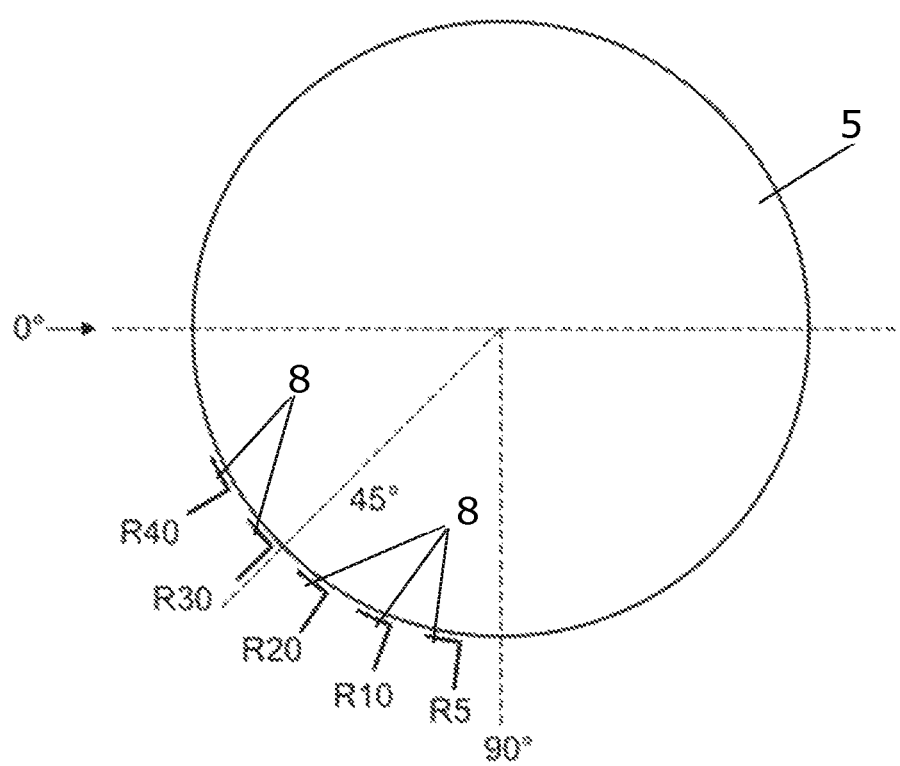
FIGS. 5a and 5b show a blade carrying structure arm of a wind turbine according to a third embodiment of the invention.
Figure 5B:
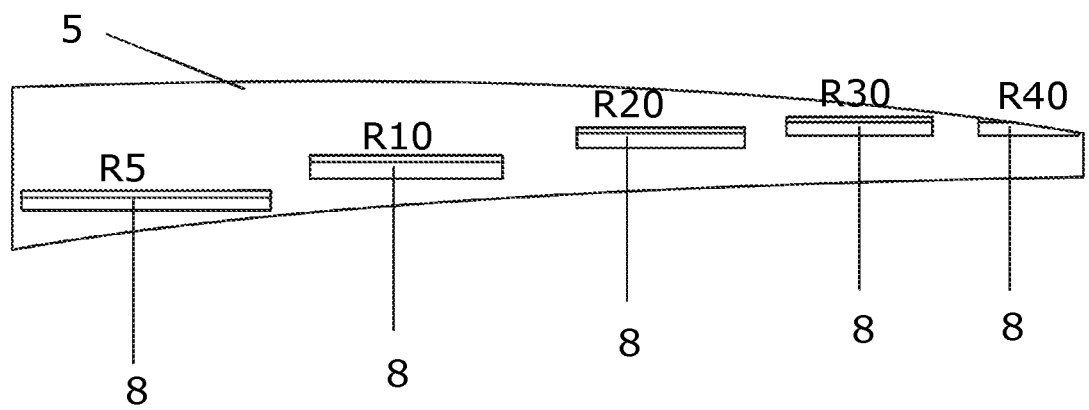

FIGS. 5a and 5b show a blade carrying structure arm 5 of a wind turbine according to a third embodiment of the invention. The blade carrying structure arm 5 is provided with elements 8 in the form of five gurney flaps distributed along and circumferentially around the arm 5 such that each gurney flap 8 experiences different angles of attack, and thereby individually contributes to the lift coefficient. FIG. 5a shows a cross sectional view of the arm 5 showing how the gurney flaps 8 are distributed around the circumference of the arm 5 with different attachment angles. The gurney flaps 8 differ among each other in their height-diameter ratio (h/D) and their length, i.e., R5 has 6% h/D, R10 has 5% h/D, R20 has 4% h/D, R30 has 3% h/D, and R40 has 2% h/D.

FIG. 5b shows a side view of the arm 5 where difference in length between different gurney flaps 8 is show. FIG. 5b also shows that R5 is placed closest to the hub, e.g. 5 m from the hub, while R40 is placed furthest from the hub, e.g., at 40 m distance from the hub. Each gurney flap R5-R40 experiences different angles of attack as they are placed at different positions around the arm 5, thereby experiencing the incoming wind differently and thereby individually contributing to the lift coefficient. Lift coefficient dependency as a function of angle of attack for each gurney flap R5-R40 is shown in FIG. 6.

Figure 6:
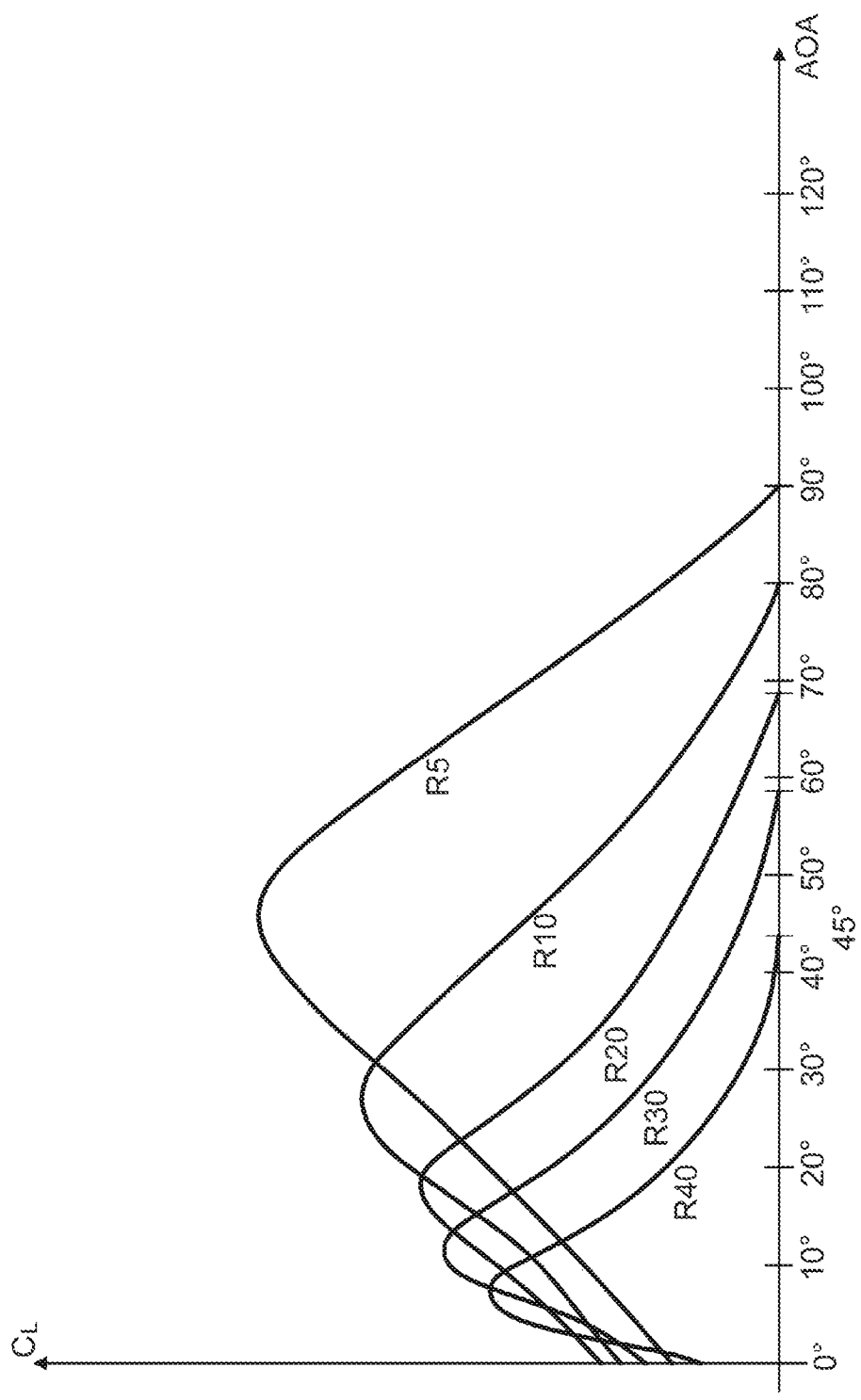
FIG. 6 is a graph showing lift coefficient as a function of angle of attack of the blade carrying structure arm shown in FIGS. 5a and 5b.

FIG. 6 is a graph showing lift coefficient $C_L$ as a function of angle of attack AOA of the blade carrying structure shown in FIG. 5. The graph shows five individual curves for each of the gurney flaps R5-R40. Each gurney flap R5-R40 will contribute differently to the lift coefficient $C_L$ of the blade carrying structure depending on an angle of attack AOA to which it is exposed. The angle of attack AOA which the gurney flaps R5-R40 experience changes as rotational speed of the rotor changes. The rotational speed of the rotor changes when the wind speed changes. Therefore, the angle of attack which the gurney flaps R5-R40 experience changes with the wind speed. The gurney flaps R5-R40 are designed and positioned in such a manner that they drastically increase the lift coefficient $C_L$ at low wind speeds while at high wind speeds their influence on the lift coefficient $C_L$ is minor. This is explained in Table 1. For example, at low wind speeds, 2-22 m/s, gurney flap R5 is positioned on the blade carrying structure so as to experience wind with an angle of attack within the range 45°-56°, thereby maximally increasing the lift coefficient of the blade carrying structure, as can be seen on R5 curve of the graph of FIG. 6. As the wind speed increases, the gurney flap R5 will experience higher angles of attack and therefore lower lift coefficient $C_L$ of the blade carrying structure. From Table 1 it can be seen that, at low wind speeds, all the gurney flaps R5-R40 experience angles of attack which result in maximum lift coefficient, while it is opposite for high wind speeds.

TABLE 1

|  | AOA at 2-22 m/s | AOA at 24 m/s | AOA at 42 m/s | AOA at 50 m/s |
| --- | --- | --- | --- | --- |
| R5 | 45°-56° | ~80° | ~85° | ~87° |
| R10 | 25°-36° | ~68° | ~76° | ~80° |
| R20 | 17°-25° | ~58° | ~67° | ~72° |
| R30 | 10°-15° | ~42° | ~56° | ~63° |
| R40 | 8°-13° | ~38° | ~52° | ~57° |

Figure 7:
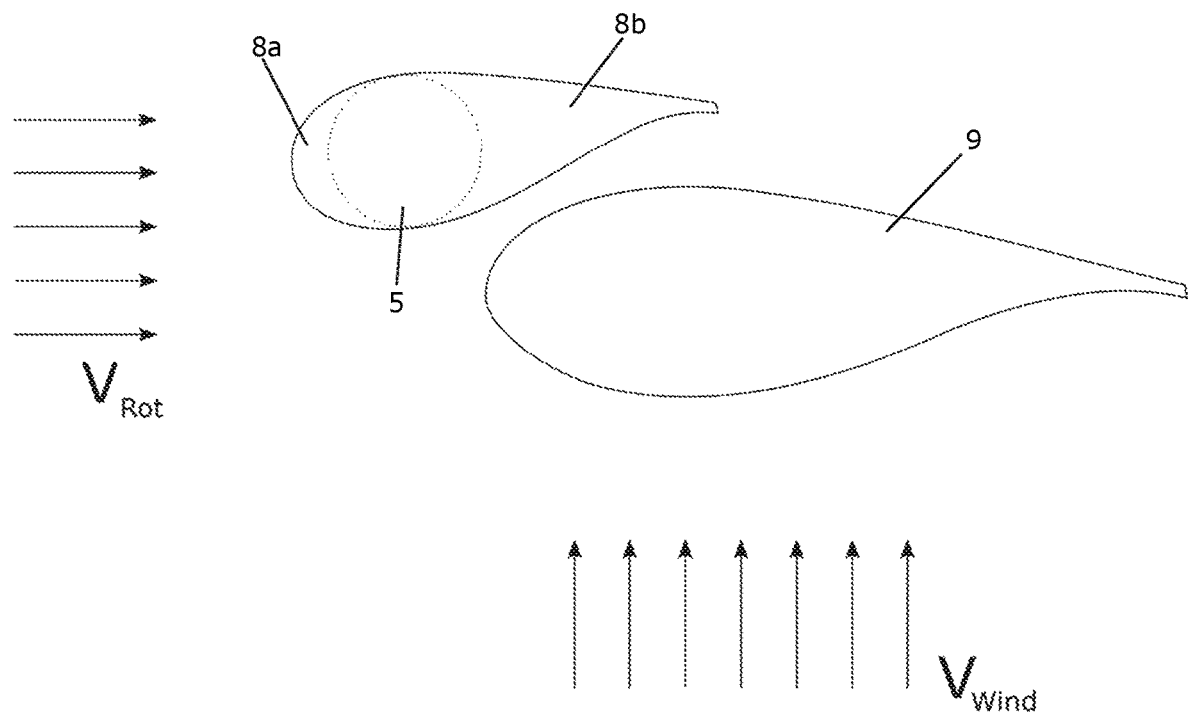
FIG. 7 shows a blade carrying structure arm and an inner blade part of a wind turbine according to a fourth embodiment of the invention.

FIG. 7 shows a cross sectional view of a blade carrying structure arm 5 and an inner blade part 9 of a wind turbine according to a fourth embodiment of the invention. The blade carrying structure arm 5 comprises elements 8a and 8b which, together with the blade carrying structure 5, form an airfoil. The element 8a is in the form of a leading edge portion of the airfoil and the element 8b is in the form of a trailing edge portion of the airfoil. By mounting the leading edge portion 8a and the trailing edge portion 8b on the blade carrying structure 5 with a circular cross-section, as shown in FIG. 7, the lift of the blade carrying structure is increased while decreasing the drag at the same time. The airfoil portions 8a, 8b may be bolted or glued to the arm 5.

The airfoil elements 8a, 8b are attached to the arm 5 in an overlapping region between the arm 5 and the inner blade part 9 of the wind turbine blade. In FIG. 7 the inner blade part 9 is shown in a position defining minimum pivot angle, thereby arranging the inner blade part 9 close to the airfoil elements 8a, 8b. This allows the inner blade part 9 and the airfoil elements 8a, 8b to cooperate in order to increase lift of the blade carrying structure, in particular at low wind speeds, and thereby small angles of attack. This improves the performance of the inner blade part 9 an prevents stall within a larger range of angles of attack.

In FIG. 7 the direction of the incoming wind, $v_{wind}$, as well as the direction of the relative movement between the air, on the one hand, and the inner blade part 9 and the arm 5, on the other hand, due to rotation of the hub, $v_{Rot}$, are also shown. The resulting direction of the incoming wind, relative to the inner blade part 9 and the arm 5, defining the angle of attack, is a vector summation of these two.

Figure 8A:
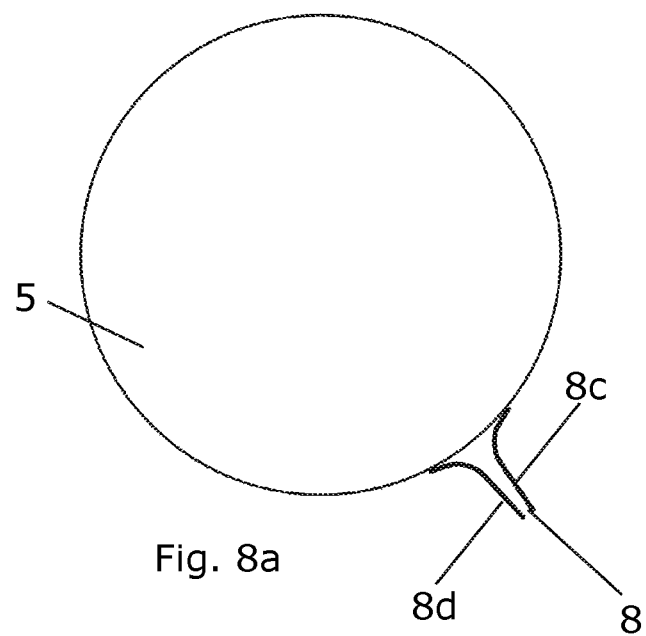
FIGS. 8a and 8b show a blade carrying structure arm of a wind turbine according to a fifth embodiment of the invention.
Figure 8B:
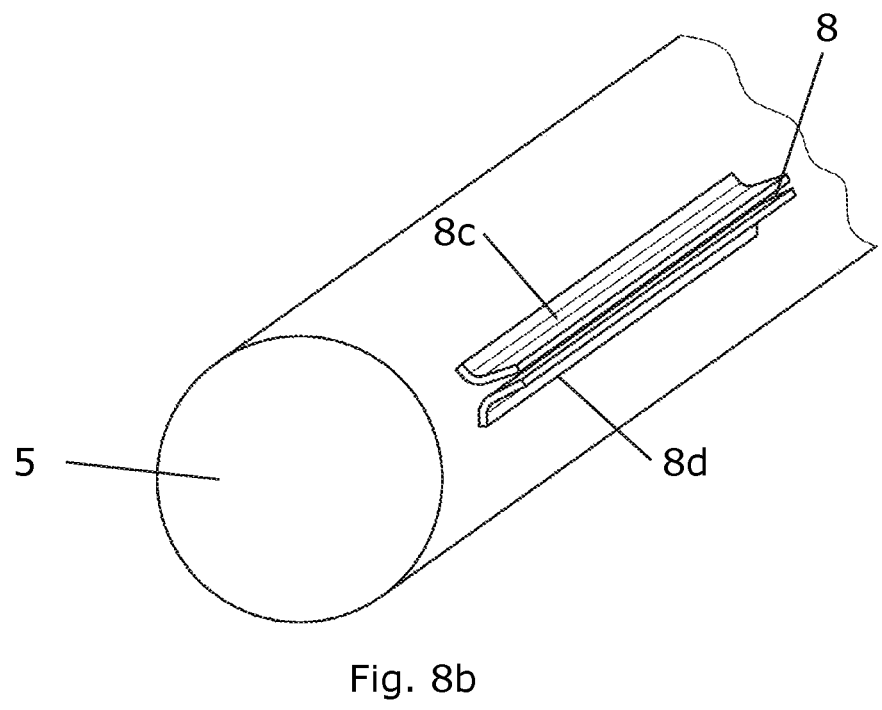

FIGS. 8a and 8b show a blade carrying structure arm 5 of a wind turbine according to a fifth embodiment of the invention. The blade carrying structure arm 5 is provided with an element 8 being formed by two bended profiles 8c and 8d positioned against each other forming a shell-like structure. This element is hereinafter referred to as a 'sea shell'. The bended profiles 8c and 8d are bonded to each other and also to the blade carrying structure 5. These two bended profiles 8c and 8d can be optimized for increased lift at specific angles of attack intervals. Alternatively or additionally, the sea shell 8 can be designed to act as a vortex generating element thereby controlling separated turbulent flow along the blade carrying structure 5. The sea shell 8 may be formed in plastic or another material. Bonding the plastic profiles 8c and 8d to the surface of the blade carrying structure 5 makes the sea shells 8 an extremely robust solution which may last for a long period of time. FIG. 8a shows a cross sectional view of the blade carrying structure 5 with the sea shell 8, and FIG. 8b shows a perspective view of the blade carrying structure 5 with the sea shell 8.

Figure 9A:
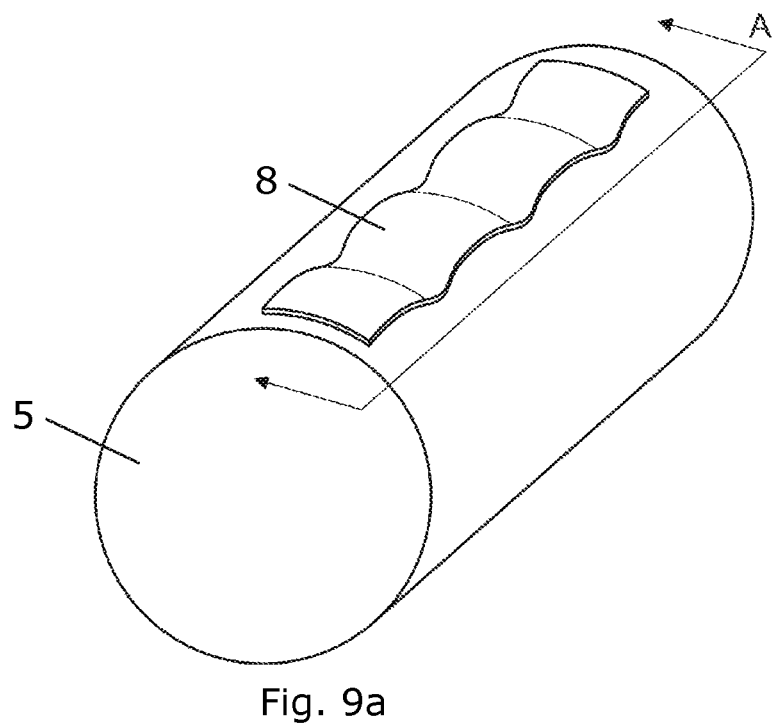
FIGS. 9a and 9b show a blade carrying structure arm of a wind turbine according to a sixth embodiment of the invention.
Figure 9B:
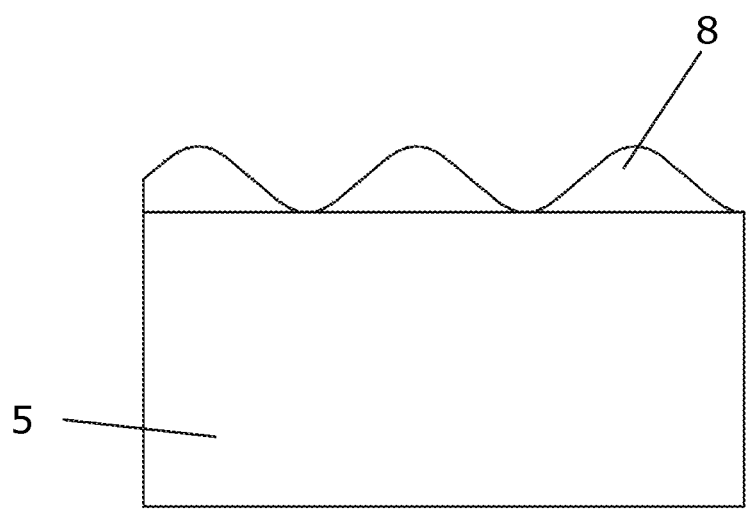

FIGS. 9a and 9b show a blade carrying structure arm 5 of a wind turbine according to a sixth embodiment of the present invention. The blade carrying structure arm 5 is provided with an element 8 in the form of an undulating pattern mimicking whale-like curves. This type of element 8 is hereinafter referred to as 'whale curves'. FIG. 9a shows the whale curves 8 which are added to the blade carrying structure 5 by, e.g., bonding. They have a shape which is similar to one which whales have to help them swim in the water. The whale curves 8 guide airflow around the blade carrying structure 5, thereby generating lift which acts on the portion of the blade carrying structure 5 where the whale curves 8 are arranged. FIG. 9b shows a cross-sectional view of the blade carrying structure 5 with the whale curves 8 arranged thereon.

Figure 10A:
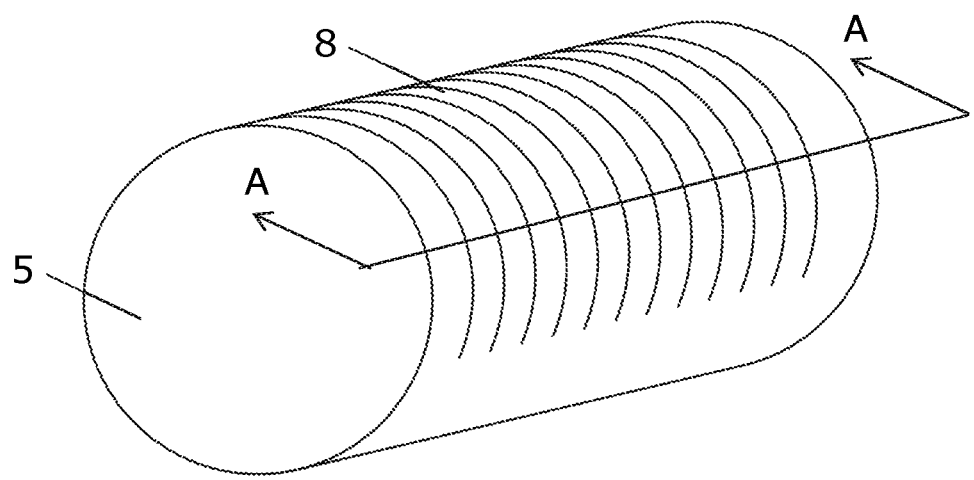
FIGS. 10a-10c show a blade carrying structure arm of a wind turbine according to a seventh embodiment of the invention.
Figure 10B:
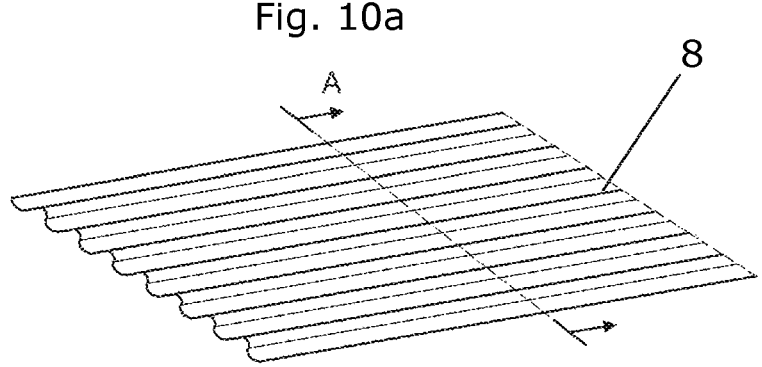
Figure 10C:
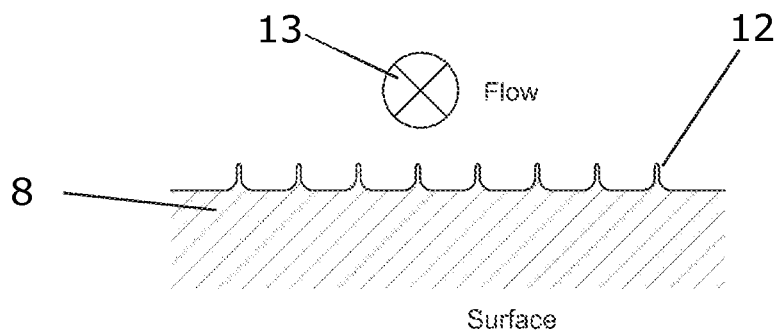

FIGS. 10a-10c show a blade carrying structure arm 5 of a wind turbine according to a seventh embodiment of the present invention. According to this embodiment, the blade carrying structure arm 5 is provided with an element 8 which mimics the skin of sharks, which is created by nature for reducing drag in water flow, resulting in the efficient movement of sharks through the water. This type of element 8 is hereinafter referred to as a 'shark skin'. The shark skin element 8 is configured to reduce drag coefficient of the blade carrying structure 5. FIG. 10a shows a mat of shark skin element 8 placed onto the surface of the blade carrying structure 5 thereby reducing drag forces imposed to the blade carrying structure 5. The shark skin 8 may be glued to the blade carrying structure 5, enabling manufacturing the blade carrying structure 5 in a simple manner without the shark skin 8 (or any other elements 8), thereby simplifying the manufacturing process significantly.

FIG. 10b shows a mat of shark skin element 8 which can be arranged onto the blade carrying structure 5 along direction AA.

FIG. 10c shows a cross-sectional view of the shark skin 8. The shark skin 8 comprises tiny scales 12 also known as dermal denticles which are shaped like small riblets and aligned in the direction of wind flow as indicated by a directional symbol 13.

Figure 11:
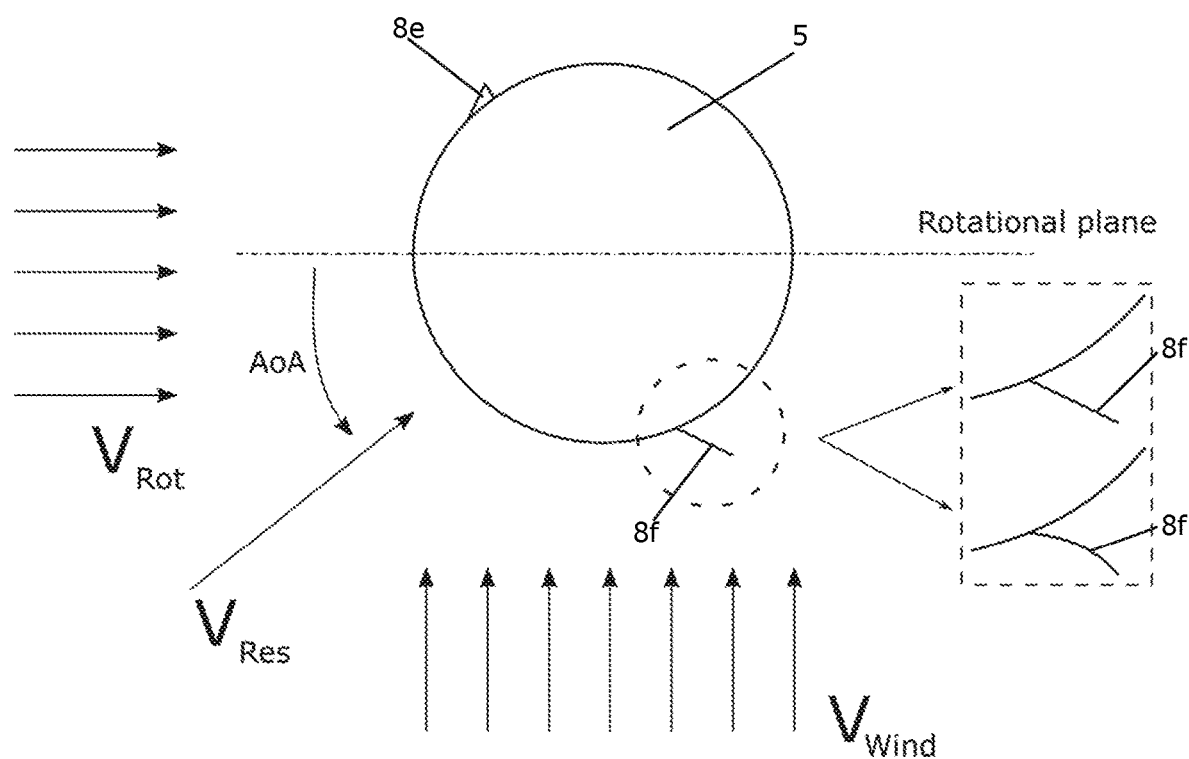
FIG. 11 shows a blade carrying structure arm of a wind turbine according to an eighth embodiment of the invention.

FIG. 11 shows a blade carrying structure arm 5 of a wind turbine according to an eighth embodiment of the invention. According to this embodiment the, the blade carrying structure arm 5 is provided with a vortex generator 8e and a spoiler 8f. The vortex generator 8e is arranged on a part of the arm 5 which may be regarded as near a 'leading edge' and on a 'suction side'. The spoiler 8f is arranged on a part of the blade carrying structure arm 5 which may be regarded as near a 'trailing edge' and on a 'pressure side'. The spoiler 8f extends from the surface of the blade carrying structure arm 5 along a direction which is neither perpendicular to, nor parallel to the surface. It can be seen from the insert that the spoiler 8f may extend along a linear direction, or it may extend along a curved direction.

When subjected to air flow, the vortex generator 8e creates vortices which tend to retain the air flow towards the surface of the blade carrying structure arm 5. When subjected to air flow, the spoiler 8f guides the air in a direction defined by the direction in which the spoiler 8f extends from the blade carrying structure arm 5.

In FIG. 11, the direction of the incoming wind, $v_{wind}$, as well as the direction of the relative movement between the air the arm 5, due to rotation of the hub, $v_{Rot}$, are also shown. The resulting direction of the incoming wind, $v_{Res}$, relative to the arm 5, derived from these two and defining the angle of attack (AOA), is also shown.

At low wind speeds, the angle of attack is small, and the resulting wind direction, $v_{Res}$, is close to $v_{Rot}$. Thereby the incoming wind reaches the vortex generator 8e as well as the spoiler 8f, and the two will cooperate in increasing the lift of the arm 5.

At high wind speeds, the angle of attack is large, and the resulting wind direction, $v_{Res}$, is close to $v_{Wind}$. Thereby the incoming wind reaches the spoiler 8f, but not the vortex generator 8e. This results in reduced lift as well as reduced drag, as compared to the angles of attack where the incoming wind also reaches the vortex generator 8e. In particular, at very high wind speeds, where the wind turbine is shut down in order to protect the wind turbine, the drag is lower as compared to the characteristics at low angles of attack, thereby providing improved protection of the wind turbine.

Figure 12:
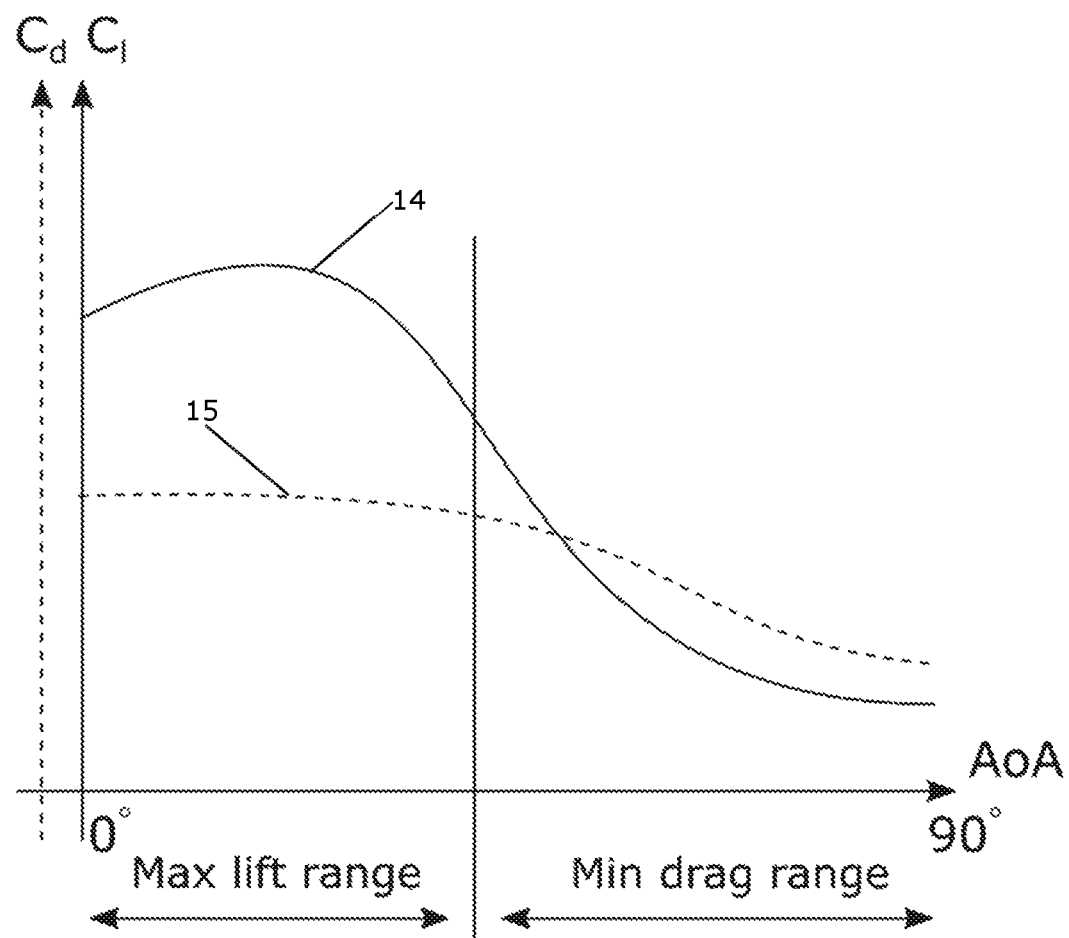
FIG. 12 is a graph showing lift coefficient and drag coefficient as a function of angle of attack of a blade carrying structure of a wind turbine according to an embodiment of the invention.

FIG. 12 is a graph showing lift coefficient 14 and drag coefficient 15 as a function of angle of attack of a blade carrying structure of a wind turbine according to an embodiment of the invention. The blade carrying structure could, e.g., be the blade carrying structure illustrated in FIG. 11.

It can be seen that the lift coefficient 14 is significantly higher at small angles of attack than at large angles of attack, and that a maximum lift coefficient is defined within the angle of attack interval designated 'Max lift range'. It can further be seen that the lift coefficient 14 decreases drastically as the angle of attack approached 90°. Thus, at low wind speeds, where it is desirable to extract as much energy as possible from the wind, resulting in small angles of attack, the lift coefficient 14 is large, thereby improving the ability of the blade carrying structure to extract energy from the wind significantly. On the other hand, at high wind speeds, where sufficient energy may already be extracted from the wind by the wind turbine blades, resulting in large angles of attack, the lift coefficient 14 is small, thereby providing only a small increase in the energy production contribution from the blade carrying structure.

It can further be seen that the drag coefficient 15 is also higher at small angles of attack than at large angles of attack. The drag coefficient 15 is substantially constant within the angle of attack interval designated 'Max lift range'. Within the angle of attack interval designated 'Min drag range', the drag coefficient 15 decreases towards a minimum drag coefficient at an angle of attack of approximately 90°. Thus, at low wind speeds, resulting in small angles of attack, a drag is introduced. However, this is more than outbalanced by the increased lift described above. At high wind speeds, resulting in large angles of attack, the drag is low. This is particularly advantageous at very high wind speeds, where the wind turbine is shut down in order to protect the wind turbine. In this case the low drag provides additional protection to the wind turbine, in particular to the blade carrying structure.

The invention claimed is:

1. A wind turbine, comprising:
    a tower,
    a nacelle mounted on the tower via a yaw system,
    a hub mounted rotatably on the nacelle, the hub comprising a blade carrying structure, and
    one or more wind turbine blades connected to the blade carrying structure via a hinge, each wind turbine blade thereby being arranged to perform pivot movements relative to the blade carrying structure between a minimum pivot angle and a maximum pivot angle,
    wherein each wind turbine blade does not rotate about a longitudinal axis of the respective blade,
    wherein the blade carrying structure is provided with one or more elements configured to improve aerodynamic properties of a surface of the blade carrying structure by increasing a lift and/or decreasing a drag of the blade carrying structure, and
    wherein the increase in lift and/or decrease in drag varies as a function of angle of attack (AOA) between the blade carrying structure and the incoming wind.

2. The wind turbine according to claim 1, wherein the increase in lift varies as a function of angle of attack (AOA) in such a manner that the lift decreases as the angle of attack (AOA) increases.

3. The wind turbine according to claim 1, wherein the decrease in drag varies as a function of angle of attack (AOA) in such a manner that the drag decreases as the angle of attack (AOA) increases.

4. The wind turbine according to claim 1, wherein the blade carrying structure comprises one or more arms, each wind turbine blade being mounted on one of the arms, and wherein one or more of the elements are arranged on the arms.

5. The wind turbine according to claim 4, wherein one or more of the elements are distributed on the arms along a radial direction of the arms and/or along a circumference of the arms.

6. The wind turbine according to claim 1, wherein each of the wind turbine blades defines an aerodynamic profile between an inner tip and an outer tip, and wherein the hinge is arranged on the wind turbine blade at a non-zero distance from the inner tip and at a non-zero distance from the outer tip.

7. The wind turbine according to claim 1 wherein a part of the wind turbine blade is arranged adjacent to a part of the blade carrying structure when the wind turbine blade is in a position defining minimum pivot angle, thereby forming an overlapping region between the wind turbine blade and the blade carrying structure, and wherein the elements are arranged on the blade carrying structure outside of the overlapping region.

8. The wind turbine according to claim 1 wherein at least one of the elements is a vortex generating element.

9. The wind turbine according to claim 1, wherein at least one of the elements is configured to guide a flow along the surface of the blade carrying structure.

10. The wind turbine according to claim 1, wherein at least one of the elements is a spoiler.

11. The wind turbine according to claim 1, wherein at least one of the elements is glued onto the surface of the blade carrying structure.

12. The wind turbine according to claim 1, wherein at least one element is an actively controlled device.

13. The wind turbine according to claim 1, wherein at least one element is a passive device.

* * * * *